(12) United States Patent
Peterson et al.

(10) Patent No.: US 7,743,180 B2
(45) Date of Patent: Jun. 22, 2010

(54) METHOD, SYSTEM, AND PROGRAM FOR MANAGING PATH GROUPS TO AN INPUT/OUTPUT (I/O) DEVICE

(75) Inventors: Beth Ann Peterson, Tucson, AZ (US);
Juan Alonso Coronado, Tucson, AZ (US); Brian Dow Clark, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 10/916,186

(22) Filed: Aug. 10, 2004

(65) Prior Publication Data

US 2006/0036782 A1 Feb. 16, 2006

(51) Int. Cl.
*G06F 3/00* (2006.01)
*G06F 12/00* (2006.01)
*G06F 13/00* (2006.01)
*H04L 12/28* (2006.01)
*H04J 3/16* (2006.01)

(52) U.S. Cl. .......... 710/38; 710/5; 710/8; 710/15; 710/100; 710/108; 710/200; 710/240; 370/254; 370/395.3; 370/465

(58) Field of Classification Search ............ 710/38, 710/8, 200
See application file for complete search history.

(56) References Cited

U.S. PATENT DOCUMENTS

| | | | |
|---|---|---|---|
| 4,207,609 A * | 6/1980 | Luiz et al. .......... 710/38 |
| 4,396,984 A | 8/1983 | Videki, II |
| 4,413,317 A | 11/1983 | Swenson |
| 4,455,605 A * | 6/1984 | Cormier et al. .......... 710/38 |
| 4,648,029 A | 3/1987 | Cooper et al. |
| 4,746,855 A * | 5/1988 | Wrinn .......... 324/763 |
| 5,138,614 A * | 8/1992 | Baumgartner et al. ....... 370/261 |
| 5,161,227 A | 11/1992 | Dias et al. |
| 5,167,022 A * | 11/1992 | Bahr et al. .......... 710/108 |
| 5,303,391 A * | 4/1994 | Simcoe et al. .......... 710/240 |
| 5,408,646 A | 4/1995 | Olnowich et al. |
| 5,414,415 A | 5/1995 | Ueda et al. |
| 5,420,988 A * | 5/1995 | Elliott .......... 712/300 |

(Continued)

OTHER PUBLICATIONS

IBM Corp., "Transaction Processing Facility Concepts and Structures" Version 4 Release 1, document No. GH31-0139-12, Thirteen Edition, Jun. 2002, pp. 1-51.

(Continued)

*Primary Examiner*—Alan Chen
*Assistant Examiner*—Henry Yu
(74) *Attorney, Agent, or Firm*—David W. Victor; Konrad Raynes & Victor LLP

(57) ABSTRACT

Provided are a method, system, and program for managing path groups to an Input/Output (I/O) device. Indication is made of a connection path on which a processing system initially communicated an establish request to establish a connection with an I/O device, wherein attention that the processing system may own a lock for the I/O device is transmitted down the indicated connection path. A request is received from the processing system to add a path to a path group with respect to the I/O device, wherein the added path is capable of comprising the connection path the processing system used to establish the connection with the I/O device. The received path is added to the path group.

18 Claims, 5 Drawing Sheets

U.S. PATENT DOCUMENTS

| | | | |
|---|---|---|---|
| 5,423,044 A * | 6/1995 | Sutton et al. | 710/200 |
| 5,471,609 A * | 11/1995 | Yudenfriend et al. | 714/4 |
| 5,493,724 A * | 2/1996 | Cohn et al. | 710/38 |
| 5,530,953 A | 6/1996 | Nagazumi | |
| 5,551,066 A | 8/1996 | Stillman et al. | |
| 5,717,862 A | 2/1998 | Annapareddy et al. | |
| 5,931,912 A * | 8/1999 | Wu et al. | 709/224 |
| 6,088,757 A | 7/2000 | Boonie et al. | |
| 6,189,007 B1 | 2/2001 | Boonie et al. | |
| 6,215,771 B1 | 4/2001 | Turner et al. | |
| 6,219,751 B1 | 4/2001 | Hodges | |
| 6,253,274 B1 * | 6/2001 | Boonie et al. | 710/200 |
| 6,274,222 B1 | 8/2001 | Sasaki et al. | |
| 6,289,019 B1 * | 9/2001 | Dieudonne | 370/395.3 |
| 6,353,869 B1 | 3/2002 | Ofer et al. | |
| 6,629,204 B2 * | 9/2003 | Tanaka et al. | 711/114 |
| 6,643,699 B1 * | 11/2003 | Liver | 709/226 |
| 6,668,335 B1 | 12/2003 | Breach et al. | |
| 6,917,596 B1 * | 7/2005 | Wight et al. | 370/254 |
| 7,096,324 B1 | 8/2006 | May et al. | |
| 7,188,198 B2 * | 3/2007 | Beukema et al. | 710/52 |
| 2003/0223416 A1 * | 12/2003 | Rojas et al. | 370/389 |
| 2004/0076176 A1 * | 4/2004 | Kfir | 370/465 |

OTHER PUBLICATIONS

IBM Corp., "Enterprise Systems Architecture/390 Principles of Operation", document No. SA22-7201-08, Ninth Edition, Jun. 2003, Chapters 1, 13 and 17.

U.S. Patent Application entitled "Method, System, and Program for Returning Attention to a Processing System Requesting a Lock", filed Aug. 10, 2004, by inventors B.A. Peterson, J.A. Coronado and B.D. Clark.

First Office Action dated Apr. 3, 2006 for U.S. Appl. No. 10/916,171, filed Aug. 10, 2004.

First Final Office Action dated Jul. 25, 2006 for U.S. Appl. No. 10/916,171, filed Aug. 10, 2004.

Third Office Action dated Jan. 30, 2007 for U.S. Appl. No. 10/916,171, filed Aug. 10, 2004.

Second Final Office Action dated May 24, 2007 for U.S. Appl. No. 10/916,171, filed Aug. 10, 2004.

Fifth Office Action dated Oct. 1, 2007 for U.S. Appl. No. 10/916,171, filed Aug. 10, 2004.

Third Final Office Action dated Feb. 28, 2008 for U.S. Appl. No. 10/916,171, filed Aug. 10, 2004.

Seventh Office Action dated Jun. 17, 2008 for U.S. Appl. No. 10/916,171, filed Aug. 10, 2004.

Fourth Final Office Action dated Nov. 20, 2008 for U.S. Appl. No. 10/916,171, filed Aug. 10, 2004.

Ninth Office Action dated Apr. 22, 2009 for U.S. Appl. No. 10/916,171, filed Aug. 10, 2004.

* cited by examiner

Lock Entry

Connection Path Table Entry

Path Group Table Entry

METHOD, SYSTEM, AND PROGRAM FOR MANAGING PATH GROUPS TO AN INPUT/OUTPUT (I/O) DEVICE

BACKGROUND OF THE INVENTION

1. Field of the Invention

The present invention relates to a method, system, and program for managing path groups to an I/O device.

2. Description of the Related Art

In certain computing environments, multiple host systems may communicate with multiple control units providing access to storage devices, such as interconnected hard disk drives, through one or more logical paths. The interconnected drives may be configured as a Direct Access Storage Device (DASD), Redundant Array of Independent Disks (RAID), Just a Bunch of Disks (JBOD), etc. For instance, the hosts may implement International Business Machines Corporation's (IBM®) Transaction Facility Processing (TPF) operating system in different processing systems in the hosts that issue Multi-Path Lock Facility (MPLF) locking requests to a control unit, such as an IBM Enterprise Storage Server (ESS)®, for data in a storage device managed by the ESS receiving the request. (IBM and ESS are registered trademarks of IBM). The ESS server microcode manages the locks for resources requested by the hosts using the TPF software.

A host granted a lock to a storage resource by the ESS lock manager may have exclusive or non-exclusive access to a track or data in the storage devices managed by the ESS. In this way, the ESS server manages locking for requests from many host systems.

In host systems implementing the IBM Enterprise Systems Architecture/390® (ESA/390), the processing systems executing in each host may comprise logical partitions of a processor, which divides a single processor into two or more logical independent processing systems. (IBM Enterprise Systems Architecture/390 is a registered trademark of IBM) Each logical partition communicates with one or more ESS servers, or other control units, over one or more logical paths.

Each TPF host connected to a logical partition in the ESS is a unique user of that partition. When a user connects to a logical partition, the path and device on which the host connects are retained as the connection path and connection device. This connection path and device may be associated with a particular path group comprising multiple logical paths to a control unit. However, the host TPF software may issue the disband path groups command for the intended connection path and device prior to connection. A user may connect on any logical path into the ESS.

In the current art, a user within a logical partition executing TPF software or other software capable of issuing the MPLF specific command set, may communicate a lock request to a control unit down a logical path. This path may or may not be the connection path and may or may not be in a path group. If the user cannot get the lock and the user has requested to be queued as a waiter, then once the lock becomes available for the user to hold, the ESS sends the user an attention interrupt and message to notify the user that the user is a holder of the lock. Until the user receives such attention, the user cannot process the user's I/O and the user's single threaded queues will increase while waiting to obtain the attention and the lock. The attention is required to go to the connection path/device. If this connection path/device is within a path group, then as per path group architecture, the attention may go to any path in the path group for the device. However, with the path group architecture, the attention may be sent on a path in the path group to a host/user other than the user host/user to which the attention is actually intended. In such case where the attention is sent to the wrong user, the user is unaware of holding the lock due to not receiving the attention and notification. As a result, the user will not process queued requests and the queue will increase. In addition, if the processing system requesting the lock does not get the attention, then the further waiters of the lock will not get processed because the current new holder did not respond to the attention message from the ESS locking facility.

SUMMARY

Provided are a method, system, and program for managing path groups to an input/output (I/O) device. Indication is made of a connection path on which a processing system initially communicated an establish request to establish a connection with an I/O device, wherein attention that the processing system may own a lock for the I/O device is transmitted down the indicated connection path. A request is received from the processing system to add a path to a path group with respect to the I/O device, wherein the added path is capable of comprising the connection path the processing system used to establish the connection with the I/O device. The received path is added to the path group.

BRIEF DESCRIPTION OF THE DRAWINGS

Referring now to the drawings in which like reference numbers represent corresponding parts throughout.

DETAILED DESCRIPTION

Figure 1:
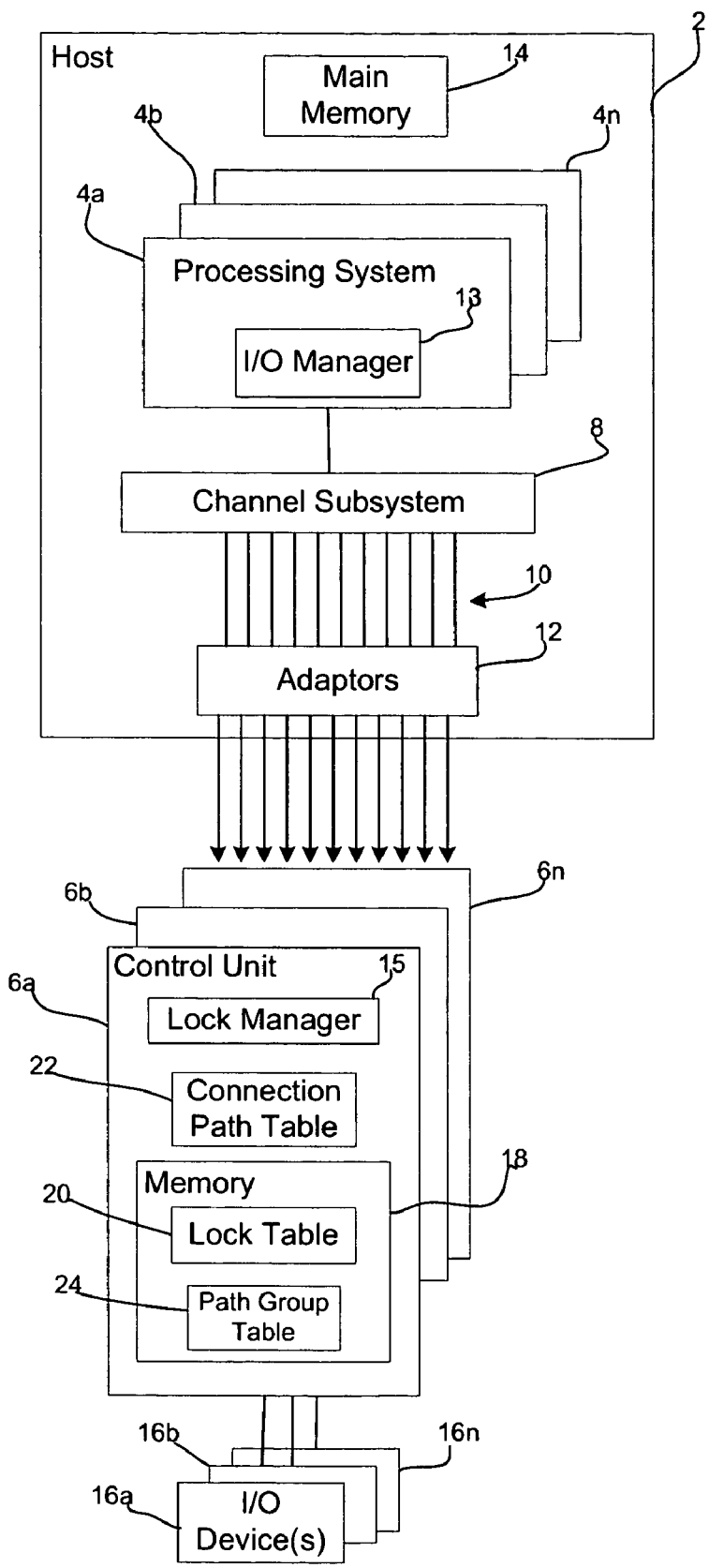
FIG. 1 illustrates a computing environment in which embodiments are implemented.

FIG. 1 illustrates a computing environment in which aspects of the invention are implemented. One or more hosts 2 (only one is shown) include processing systems 4a, 4b . . . 4n that communicate Input/Output (I/O) requests to control units 6a, 6b . . . 6n through a channel subsystem 8 that provides a plurality of logical paths to the control units 6a, 6b . . . 6n. The channel subsystem 8 manages logical paths 10 extending through adaptors 12. An adaptor provides the physical layer through which logical paths 10 extend to one control unit 6a, 6b . . . 6n or multiple control units through a switch (not shown). The channel subsystem 8 may further associate multiple logical paths 10 with a path group, where all the paths in a path group may be used to communicate with one or more control units 6a, 6b . . . 6n.

The processing systems 4a, 4b . . . 4n each include an I/O manager 13 that manages I/O requests to the control units 6a, 6b . . . 6n. A main memory 14 is a memory shared by the processing systems 4a, 4b . . . 4n. Each processing system 4a, 4b . . . 4n may comprise a central processing unit (CPU) executing programs, including I/O manager 13 code and channel subsystem 8 code. In further embodiments, each processing system may comprise a logical partition of a processor. In this way, one processor runs multiple logical partitions that each operate as independent systems, executing their own operating system, I/O manager 13 and channel subsystem 8 code. The I/O manager 13 may comprise an operating system or file system to manage I/O requests and handle locking, such as the TPF multi-path lock facility (MPLF). Further details of the TPF system are described in the publication "Transaction Processing Facility: Concepts and Structures", Version 4, Release 1, document no. GH31-0139-12 (Copyright IBM, June 2002), which publication is incorporated herein by reference in its entirety. Further details of a channel subsystem implementing logical paths is described in the publication "Enterprise System Architecture/390: Principles of Operation", document no. SA22-7201-08 (Copyright IBM, June 2003), which publication is incorporated herein by reference in its entirety.

The control units 6a, 6b . . . 6n include a lock manager 15 to manage requests from the processing systems 4a, 4b . . . 4n to access storage resources in the I/O devices 16a, 16b . . . 16n, such as tracks, partitions, logical devices, logical unit numbers (LUNs), or other logical or physical units of storage. The control units 6a, 6b . . . 6n have memory 18 in which they maintain a lock table 20. The components shown in control unit 6a, such as the lock manager 15, connection path table 22, etc., would also be included in the other control units 6b . . . 6n. The lock manager 15 maintains a connection path table 22 providing information on hosts 2 connecting to the I/O devices 16a, 16b . . . 16n managed by that control unit. The control units 6a, 6b . . . 6n may comprise any type of server, such as an enterprise storage server, storage controller, etc., or other device used to manage I/O requests to attached I/O devices, where the I/O devices may comprise storage devices known in the art, such as interconnected hard disk drives (e.g., configured as a DASD, RAID, JBOD, etc.), magnetic tape, electronic memory, etc.

The control units 6a, 6b . . . 6n further maintain in memory 18 a path group table 24 providing information on the connection paths in each path group, where path groups may be maintained for the I/O devices 16a, 16b . . . 16n indicating the logical paths 10 connecting to I/O devices. Thus, the path group table 24 would associate path groups with I/O devices, and logical paths with the path groups.

In certain embodiments, logical paths 10 may connect the processing systems 4a, 4b. . .4n in the host to one or more control units 6a, 6b. . . 6n through a physical layer, such as a cable, connecting directly to one control unit 6a, 6b. . . 6n or connecting through a switch. One processing system 4a, 4b. . . 4n may connect through logical paths implemented in different adaptors 12 to different control units. The host 2 may communicate with the control units 6a, 6b. . .6n over the logical paths 10, which may extend through a network, such as a Local Area Network (LAN), Storage Area Network (SAN), Wide Area Network (WAN), wireless network, etc. Alternatively, the host 2 may communicate with the control units 6a, 6b, 6c over a bus interface, such as a Peripheral Component Interconnect (PCI) bus or serial interface.

Figure 2:
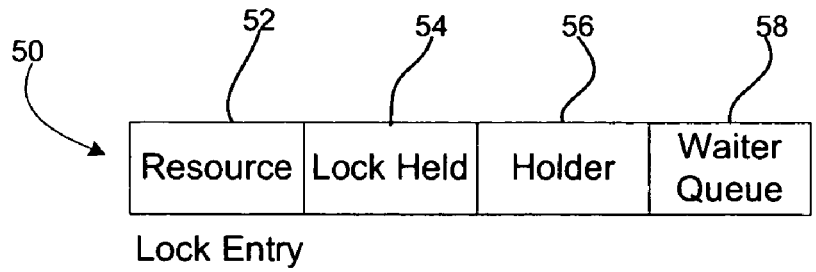
FIG. 2 illustrates information maintained in a lock table.

FIG. 2 illustrates information included with a lock entry 50, which comprises the entries in the lock table 20, including: a resource 52 subject to the lock request, such as a track, partition, logical disk, etc. in one attached I/O device 16a, 16b . . . 16n; a lock held 54 field indicating the type of lock currently held against the resource, e.g., exclusive, non-exclusive, etc.; a holder 56 identifying the processing system 4a, 4b . . . 4n currently holding the lock, indicated in the lock held 54 field; and a waiter queue 58 comprising a pointer to a queue or an actual queue of requests by processing systems 4a, 4b . . . 4n for a lock to the resource 52 that is already held.

The waiters in the wait queue 58 wait for the corresponding resource 52 indicated in the entry 50 in which the queue is indicated.

Figure 3:
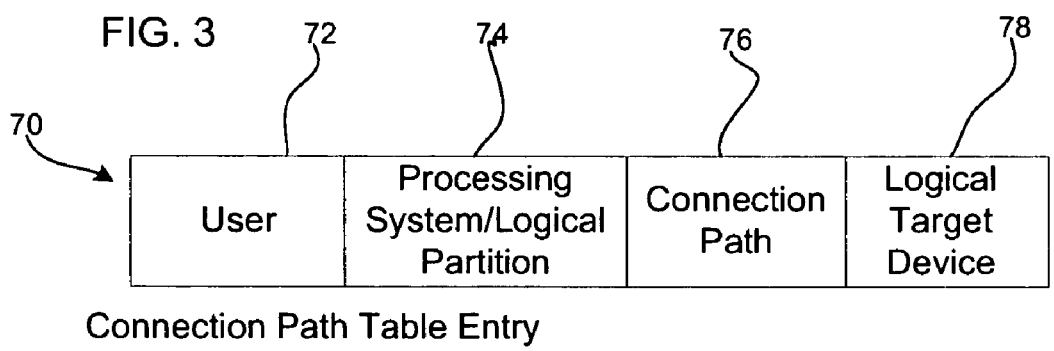
FIG. 3 illustrates information maintained in a connection path table.

FIG. 3 illustrates an entry 70 in the connection path table 22 that is added when a processing system 4a, 4b . . . 4n in one host 2 submits an establish request to establish a connection with an I/O device 16a, 16b . . . 16n. The connection path table entry 70 includes: a user 72 identifying the host submitting the request; a processing system/logical partition 74 identifying the processing system 4a, 4b . . . 4n or a logical partition therein initiating the establish connection lock request; a connection path 76 identifying a logical path 10 on which the connection was established; and a logical target device 78 identifying a logical device, e.g., logical storage, Logical Unit Number (LUN), etc., within one I/O device 16a, 16b . . . 16n to which the connection is established.

Figure 4:
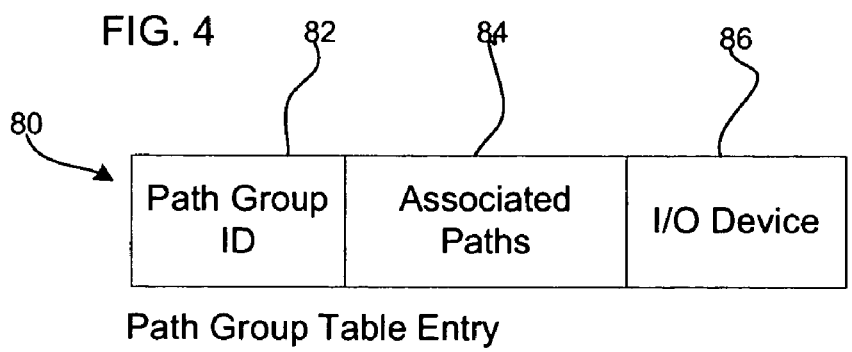
FIG. 4 illustrates information maintained in a path group table.

FIG. 4 illustrates an example of an entry 80 in the path group table 24, including a path group identifier (ID) 82; associated paths 84 that are included in the path group; and an I/O device 86 to which the paths in the path group connect.

Figure 5:
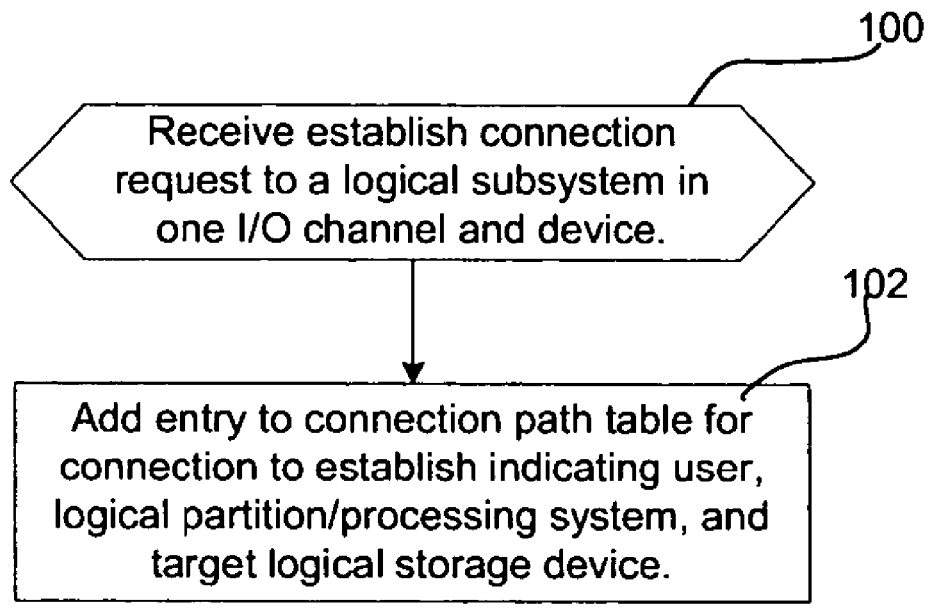
FIGS. 5, 6, and 7 illustrate operations to manage establish connection and lock requests from host systems and attention processing to those hosts.

FIG. 5 illustrates operations performed by the control unit 6a, 6b. . .6n to process an establish request from one host 2. Upon receiving (at block 100) an establish connection request from one host 2 on a logical subsystem on one I/O channel and device, referred to as the connection path, the control unit 6a, 6b. . . 6n adds (at block 102) an entry 70 to the connection path table 22 for the connection being established, indicating the user 72, the logical partition/processing system 74 initiating the connection establish request, the connection path 76 on which the establish connection request was communicated, and the logical target device 78 with which the connection is being established.

Figure 6:
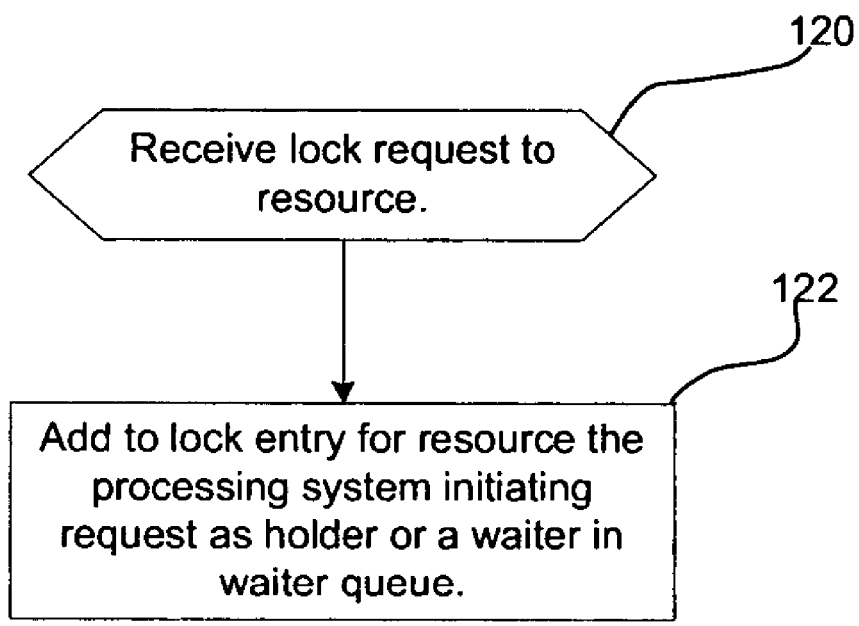

FIG. 6 illustrates operations performed by the lock manager 15 in the control units 6a, 6b. . .6n to process a lock request to a storage resource. Upon receiving (at block 120) a lock request from one processing system 4a, 4b. . .4n in one connecting host, e.g., 2, the lock manager 15 adds (at block 122) to the lock entry 50 for the requested resource, indicated in field 52, the processing system 4a, 4b. . .4n, or logical partition if the processing system is divided into logical partitions, initiating the request. The processing system 4a, 4b. . . 4n initiating the request is indicated as a holder 56 or a waiter in the waiter queue 58, depending on whether the lock for the requested resource is available.

At this point, the lock manager 15 may disconnect from the processing system 4a, 4b . . . 4n that initiated the request until the lock is available.

Figure 7:
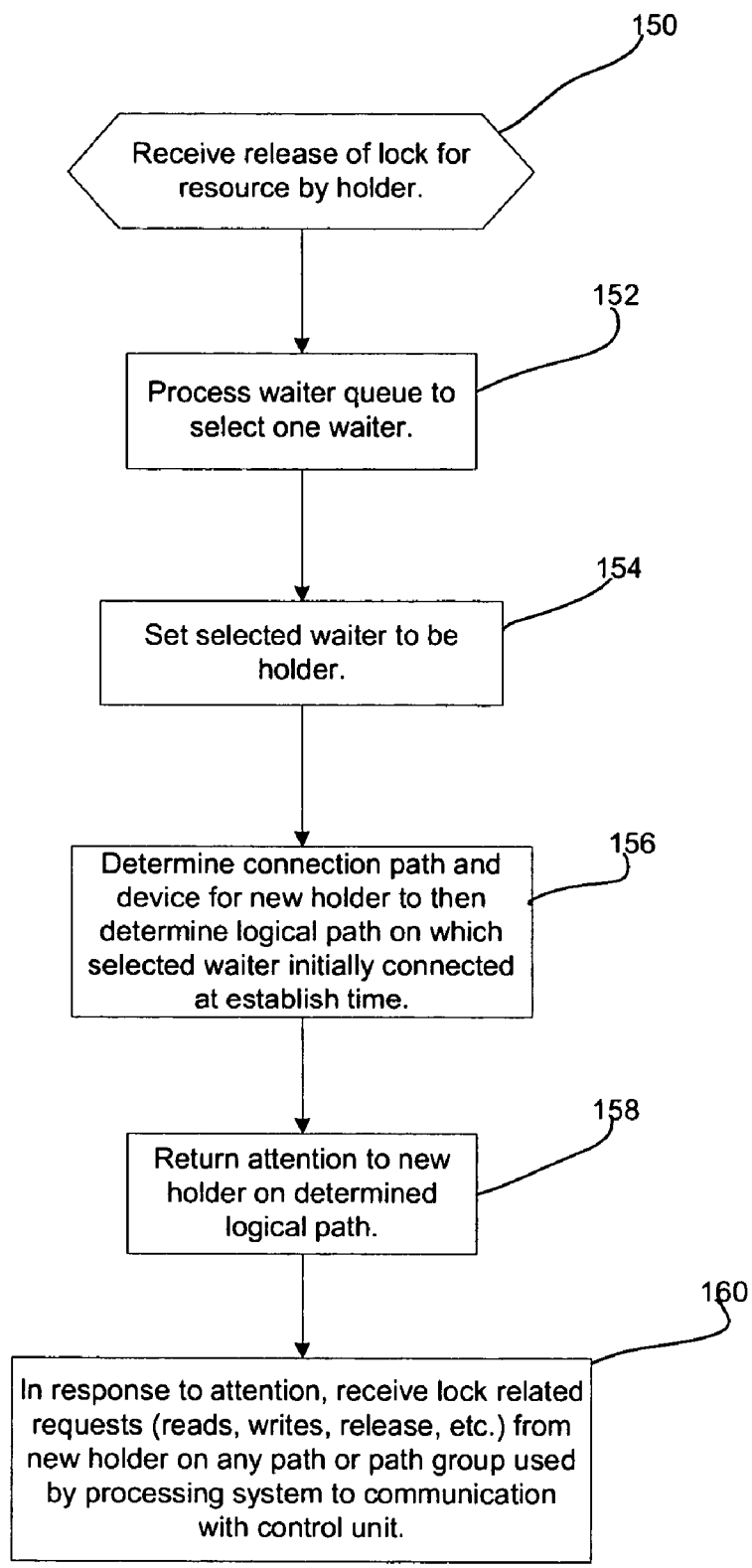

FIG. 7 illustrates operations performed by the lock manager 15 to return attention to a waiter when the lock for a resource becomes available. Upon receiving (at block 150) indication of the release of a lock for a resource by a holder, having a corresponding entry 50, the lock manager 15 processes (at block 152) the waiter queue 58 to select one waiter. The selected waiter is set (at block 154) to the holder 56. The lock manager 15 processes (at block 156) the connection path table 22 to determine the connection path in field 76 for the new lock holder, i.e., logical path 10 on which the selected waiter initially connected with the establish request. The lock manager 15 then returns (at block 158) attention to the new holder, i.e., selected waiter, on the determined connection path. In this way, the attention is returned on the same logical path, i.e., connection path, on which the processing system 4a, 4b . . . 4n initiating the lock originally connected. Thus, the lock manager 15 will not communicate the attention on any path in the path group, but only on the logical path 10 on which the processing system/waiter initially connected with the establish request, regardless of whether the connection path is in a path group. With the described embodiments, attention is returned on the specific logical path on which the waiter connected, not any logical path in a path group including logical paths that do not connect to the processing system 4a, 4b . . . 4n waiting for that attention, but instead that connect to other processing systems.

After attention is returned on the specified logical path, any other message between the host processing system 4a, 4b . . . 4n and control unit 6a, 6b . . . 6n related to the lock or resource may be transmitted on any logical path in the path group used to communicate with that control unit 4a, 4b . . . 4n holding and managing the locks (at block 160), such as messages related to read, writes, lock releases, etc.

In described embodiments, the host 2 may submit requests to the control unit 6a, 6b . . . 6n to add paths to path groups without regard as to whether the path being added is a connection path (i.e., the logical path on which the connection was initially established) on which attention may be returned. The I/O manager 13 algorithm for determining paths to add to a path group may add connection paths to a path group because the lock manager 15 in the control unit 6a, 6b . . . 6n will use the connection path table 22 to return attention down the connection path on which a connection to an I/O device 16a, 16b . . . 16n was established regardless of whether the connection path is in a path group.

Figure 8:
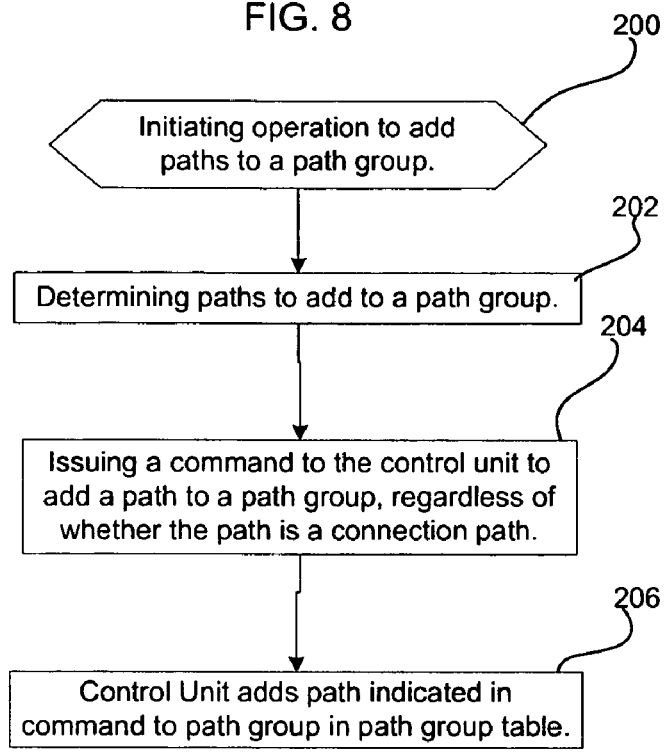
FIGS. 8 and 9 illustrate operations performed to add paths to a path group.

FIG. 8 illustrates operations the host I/O manager 13 performs when adding paths to a path group. Upon initiating (at block 200) an operation to add paths to a path group, the host I/O manager 13 determines (at block 202) paths to add to a path group. This determination may involve executing a path group algorithm to determine logical paths 10 to add to a path group to increase the number of concurrent connections to an I/O device 16a, 16b . . . 16n or logical area therein. For instance, load balancing or other operations may be performed to determine optimal assignments of logical paths to path groups to provide redundancy of paths to improve bandwidth and handle failovers. The I/O manager 13 issues one or more commands (at block 204) to the control unit 6a, 6b . . . 6n to add the determined one or more paths to one or more specified path groups, where the control units 6a, 6b . . . 6n maintain information on path groups in the path group table 24. The control unit 6a, 6b . . . 6n adds (at block 206) information on the paths indicated in the command to associated paths 84 (FIG. 4) in the path group table entry 80 for the identified path group 82 so the paths indicated in the command are associated with the path group indicated in the command.

In certain embodiments, the host I/O manager 13 may add connection paths to path groups and the control unit 6a, 6b . . . 6n may then add connection paths to a path group entry 80 defined in the path group table 24. In the described embodiments, connection paths may be assigned to path groups.

Figure 9:
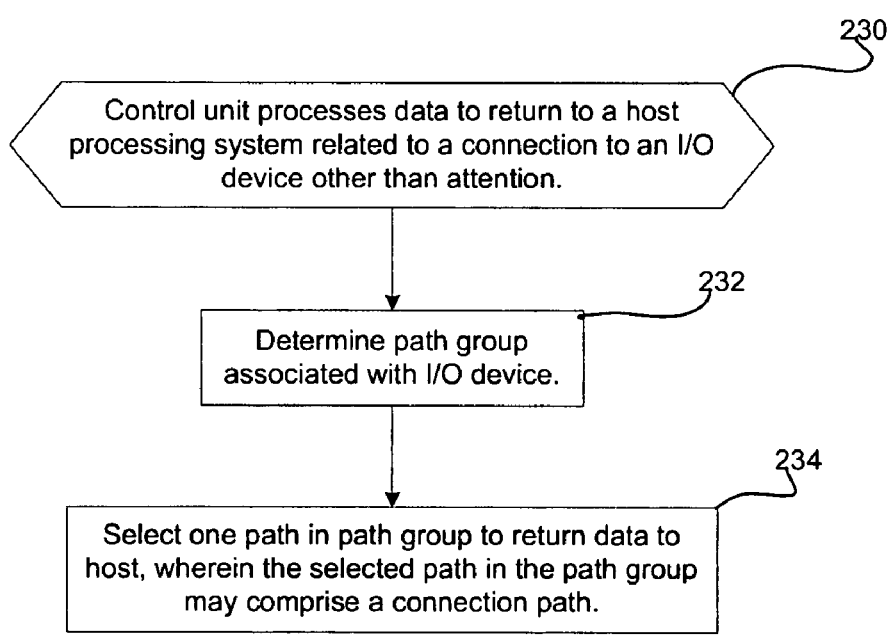

FIG. 9 illustrates operations performed by the control unit 6a, 6b . . . 6n to select a path to use to return data to a host processing system 4a, 4b . . . 4n related to a connection established with an I/O device 16a, 16b . . . 16n. Upon processing (at block 230) data to return to a host processing system 4a, 4b . . . 4n related to a connection to an I/O device 16a, 16b . . . 16n other than attention for a lock request, the control unit 6a, 6b . . . 6n determines (at block 232) the path group associated with the I/O device 16a, 16b . . . 16n involved in the communication from the path group table 24, which identifies path groups, paths associated with the path groups and the target device to which the paths connect. The control unit 6a, 6b . . . 6n selects (at block 232) one path in the determined path group to return data to the host processing system 4a, 4b . . . 4n initiating the request.

With described embodiments, assignment of paths to path groups does not prevent attention from being returned to a host because the control unit ensures that attention with respect to a lock request is returned down the connection path on which the connection was initially established. Moreover, connection paths may be added to a path group to use for communication between the host and I/O device after or before attention is transmitted down the connection path.

ADDITIONAL EMBODIMENT DETAILS

The described embodiments for copying data between controllers may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, a host adds paths to a path group, where one path group provides paths for one host. In additional embodiments, multiple hosts may add their logical paths to a single path group, such that certain logical paths in the path group enable communication with different hosts.

In described embodiments, the lock manager maintained the logical path on which the processing system connected. In alternative embodiments having multiple physical connections to the control unit, the lock manager may indicate the physical connection on which to return status, as opposed to the logical connection.

FIGS. 2, 3, and 4 show certain information included in the lock table entry, connection path entry, and path group entry. In alternative embodiments, this information may be stored in different data structures having different formats and information than shown.

The illustrated operations of FIGS. 5-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   establishing a connection with an Input/Output (I/O) device on a connection path between a host system and a control unit over a network, wherein the connection path comprises a logical path on which a connection with the I/O device was established;
   issuing at least one command to the control unit to add at least one logical path between the host system and the control unit, other than the connection path, to a path group used by the host system to communicate with the I/O device, wherein the path group indicates multiple paths that extend through the network and that the host system uses to communicate with the I/O device via the control unit;
   issuing at least one other command to the control unit to add the connection path to the path group; and
   using one logical path in the path group, including the connection path or one logical path other than the connection path, to communicate with the I/O device, wherein when returning data from the I/O device to a request from the host, one path in the path group associated with the host and the I/O device is selected to return the data from the I/O device to the host system, wherein the host system receives attention to a lock request from the control unit on the connection path, wherein attention to the lock request is not returned by the control unit on logical paths in the path group other than the connection path.

2. The method of claim 1, further comprising:
   transmitting a lock request for the I/O device;
   receiving attention that the lock is available to access on the connection path to the I/O device; and
   receiving data related to the I/O device on one path in the path group connecting to the I/O device after receiving the attention, wherein the path on which the data is received is capable of comprising the connection path or one logical path in the path group other than the connection path.

3. A method, comprising:
   indicating a connection path on which a processing system initially communicated an establish request to a control unit over a network to establish a connection with an I/O device;
   returning attention that the processing system may own a lock for the I/O device down the indicated connection path;
   receiving at least one request from the processing system to add at least one logical requested path to a path group with respect to the I/O device, other than the connection path;
   receiving at least one other request to add the connection path to the path group; and
   adding the requested paths to the path group, wherein the path group includes the connection path and paths other than a connection path on which the connection to the I/O device was established, wherein attention to a lock request to the processing system is limited to being returned on the connection path, wherein attention to the lock request is not returned on logical paths in the path group other than the connection path.

4. The method of claim 3, further comprising:
   determining one path in the path group to use to return data to the processing system concerning the I/O device associated with the path group, wherein the determined path is capable of comprising the connection path on which the connection between the processing system and the I/O device was established; and
   using the determined path to return data to the processing system concerning the I/O device.

5. The method of claim 3, wherein the attention returned on the indicated connection path to the processing system signals the processing system that the processing system may own the lock in response to the lock for the I/O device becoming available; and
   receiving and transmitting messages with the processing system concerning the I/O device on any path in the path group, including the connection path used to establish the connection with the I/O device.

6. The method of claim 3, wherein the paths on which the processing system communicates comprise logical paths.

7. A system in communication with a control unit over a network, wherein the control unit manages access to at least one Input/Output (I/O) device, comprising:
   circuitry enabled to perform:
   establishing a connection with an Input/Output (I/O) device on a connection path to a control unit over a network, wherein the connection path comprises a logical path on which a connection with the I/O device was established;
   issuing at least one command to the control unit to add at least one logical path to the control unit, other than the connection path, to a path group used to communicate with the I/O device, wherein the path group indicates multiple paths that extend through the network used to communicate with the I/O device via the control unit;
   issuing at least one other command to the control unit to add the connection path to the path group; and
   using one logical path in the path group, including the connection path or one logical path other than the connection path, to communicate with the I/O device, wherein when receiving data from the I/O device to a request, one path in the path group associated with the I/O device is used to receive the data from the I/O device, wherein attention to a lock request is received from the control unit on the connection path, wherein attention to the lock request is not received from the control unit on logical paths in the path group other than the connection path.

8. The system of claim 7, wherein the circuitry is further enabled to perform:
transmitting a lock request for the I/O device;
receiving attention that the lock is available to access on the connection path to the I/O device; and
receiving data related to the I/O device on one path in the path group connecting to the I/O device after receiving the attention, wherein the path on which the data is received is capable of comprising the connection path or one logical path in the path group other than the connection path.

9. A system in communication with a processing system over paths in a network and at least one Input/Output (I/O) device, comprising:
a computer readable storage medium;
circuitry in communication with the computer readable storage medium and enabled to perform:
indicating in the computer readable storage medium a connection path on which the processing system initially communicated an establish request over a network to establish a connection with an I/O device;
returning attention that the processing system may own a lock for the I/O device down the indicated connection path;
receiving at least one request from the processing system to add at least one logical requested path to a path group with respect to the I/O device, other than the connection path;
receiving at least one other request to add the connection path to the path group; and
adding the requested paths to the path group, wherein the path group includes the connection path and paths other than the connection path on which the connection to the I/O device was established, wherein attention to a lock request to the processing system is limited to being returned on the connection path, wherein attention to the lock request is not returned on logical paths in the path group other than the connection path.

10. The system of claim 9, wherein the circuitry is further enabled to perform:
determining one path in the path group to use to return data to the processing system concerning the I/O device associated with the path group, wherein the determined path is capable of comprising the connection path on which the connection between the processing system and I/O device was established; and
using the determined path to return data to the processing system concerning the I/O device.

11. The system of claim 9, wherein the circuitry is further enabled to perform:
returning attention on the indicated connection path to the processing system to signal the processing system that the processing system may own the lock in response to the lock for the I/O device becoming available; and
receiving and transmitting messages with the processing system concerning the I/O device on any path in the path group, including the connection path used to establish the connection with the I/O device.

12. The system of claim 9, wherein the paths on which the processing system communicates comprise logical paths.

13. An article of manufacture comprising a computer readable storage medium having code executed to communicate with a control unit over a network managing access to at least one Input/Output (I/O) device, wherein the code is executed to further perform operations, the operations comprising:
establishing a connection with an Input/Output (I/O) device on a connection path to the control unit over a network, wherein the connection path comprises a logical path on which a connection with the I/O device was established;
issuing at least one command to the control unit to add at least one logical path to the control unit, other than the connection path, to a path group used to communicate with the I/O device, wherein the path group indicates multiple paths that extend through the network used to communicate with the I/O device via the control unit;
issuing at least one other command to the control unit to add the connection path to the path group; and
using one logical path in the path group, including the connection path or one logical path other than the connection path, to communicate with the I/O device, wherein when receiving data from the I/O device to a request, one path in the path group associated with the I/O device is used to return the data from the I/O device, wherein attention to a lock request from the control unit is received on the connection path, wherein attention to the lock request is not received from the control unit on logical paths in the path group other than the connection path.

14. The article of manufacture of claim 13, wherein the operations further comprise:
transmitting a lock request for the I/O device;
receiving attention that the lock is available to access on the connection path to the I/O device; and
receiving data related to the I/O device on one path in the path group connecting to the I/O device after receiving the attention, wherein the path on which the data is received is capable of comprising the connection path or one logical path in the path group other than the connection path.

15. An article of manufacture comprising a computer readable storage medium having code executed to communicate with a network, a processing system and I/O devices, wherein the code is executed to perform operations, the operations comprising:
indicating in the computer readable storage medium a connection path on which the processing system initially communicated an establish request over the network to establish a connection with the I/O device;
returning attention that the processing system may own a lock for the I/O device down the indicated connection path;
receiving at least one request from the processing system to add at least one logical requested path to a path group with respect to the I/O device, other than the connection path receiving at least one other request to add the connection path to the path group; and
adding the requested paths to the path group, wherein the path group includes the connection path and paths other than the connection path on which the connection to the I/O device was established, wherein attention to a lock request to the processing system is limited to being returned on the connection path, wherein attention to the lock request is not returned on logical paths in the path group other than the connection path.

16. The article of manufacture of claim 15, wherein the operations further comprise:
determining one path in the path group to use to return data to the processing system concerning the I/O device associated with the path group, wherein the determined path is capable of comprising the connection path on which the connection between the processing system and I/O device was established; and using the determined path to return data to the processing system concerning the I/O device.

17. The article of manufacture of claim 15, wherein the operations further comprise:

returning attention on the indicated connection path to the processing system to signal the processing system that the processing system may own the lock in response to the lock for the I/O device becoming available; and receiving and transmitting messages with the processing system concerning the I/O device on any path in the path group, including the connection path used to establish the connection with the I/O device.

18. The article of manufacture of claim 15, wherein the paths on which the processing system communicates comprise logical paths.

\* \* \* \* \*